United States Patent
Lumbatis et al.

(10) Patent No.: US 11,949,555 B2
(45) Date of Patent: Apr. 2, 2024

(54) SETTING COUNTRY CODE IN A NETWORK ACCESS DEVICE DURING AN ONBOARDING PROCESS

(71) Applicant: ARRIS Enterprises LLC, Suwanee, GA (US)

(72) Inventors: Kurt Alan Lumbatis, Dacula, GA (US); Jay W. Strater, San Diego, CA (US); Gregory N. Nakanishi, San Diego, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/079,169

(22) Filed: Dec. 12, 2022

(65) Prior Publication Data

US 2023/0198835 A1 Jun. 22, 2023

Related U.S. Application Data

(60) Provisional application No. 63/290,902, filed on Dec. 17, 2021.

(51) Int. Cl.
*H04L 41/0806* (2022.01)
*H04L 61/5014* (2022.01)
*H04W 16/26* (2009.01)

(52) U.S. Cl.
CPC ...... *H04L 41/0806* (2013.01); *H04L 61/5014* (2022.05); *H04W 16/26* (2013.01)

(58) Field of Classification Search
CPC ........... H04L 41/0806; H04L 61/5014; H04W 16/26; H04W 76/15; H04W 48/16; H04W 84/12; H04W 92/045
See application file for complete search history.

(56) References Cited

U.S. PATENT DOCUMENTS 9,485,093 B2* 11/2016 Klein .................... H04L 9/3226
2006/0133332 A1 6/2006 Achanta
(Continued)

FOREIGN PATENT DOCUMENTS

WO 2021/204927 10/2021

OTHER PUBLICATIONS

International Search Report and Written Opinion dated Apr. 5, 2023 in International Application No. PCT/US2022/052517.
(Continued)

*Primary Examiner* — Michael Won
(74) *Attorney, Agent, or Firm* — Wenderoth, Lind & Ponack, L.L.P.

(57) ABSTRACT

A network access device, such as an extender or a multi-AP device, includes one or more backhaul stations providing one of a wireless backhaul connection and a wired backhaul connection to communicate with a root device, one or more of Fronthaul Basic Service Set (fBSS) radios initially configured in a downstate, a memory storing computer-readable instructions and includes a factory default or non-operative country code, and a processor configured to execute the computer-readable instructions to initiate an onboarding process through the root device using the one or more backhaul stations, during the onboarding process, receive a country code in a predetermined type of message, store the country code received in the predetermined type of message in the memory, and configure the one or more fBSS radios using the country code received in the predetermined type of message.

20 Claims, 7 Drawing Sheets

(56) References Cited

U.S. PATENT DOCUMENTS

| | | | |
|---|---|---|---|
| 2013/0250810 A1* | 9/2013 | Ho | H04L 45/02 370/255 |
| 2014/0298427 A1* | 10/2014 | Bahr | H04W 12/50 726/4 |
| 2017/0245280 A1* | 8/2017 | Yi | H04K 3/00 |
| 2020/0104398 A1* | 4/2020 | Ivaniuk | G06Q 30/0201 |
| 2020/0314789 A1* | 10/2020 | Bajko | H04W 12/04 |
| 2022/0046473 A1* | 2/2022 | Strater | H04L 5/0007 |
| 2022/0095219 A1* | 3/2022 | Nakagawa | H04W 88/10 |
| 2022/0104032 A1* | 3/2022 | Panje | H04W 24/02 |
| 2022/0377594 A1* | 11/2022 | Henriques De Jesus | H04W 28/0236 |
| 2023/0080739 A1* | 3/2023 | Taskin | H04W 24/10 370/252 |
| 2023/0198835 A1* | 6/2023 | Lumbatis | H04L 41/0806 709/222 |
| 2023/0224019 A1* | 7/2023 | Strater | H04W 52/34 370/315 |

OTHER PUBLICATIONS

Kannan et al., "How to Finally Conquer Wi-Fi in the Home: Service Provider-Style" A Technical Paper prepared for SCTE ISBE, 2018, XP0SSSSZ419, 46 pages.

* cited by examiner

Fig. 4a — Table 51. Higher Layer Data TLV Format — 410

| Field | Length | Value | Description |
|---|---|---|---|
| tlvType | 1 octet | 0xA0 | Higher Layer Data TLV |
| tlvLength | 2 octets | Variable | Number of Octets in Ensuing Field |
| tlvValue | 1 octet | Variable | Higher Layer Protocol |
|  | Variable | Variable | Higher Layer Protocol Payload (To Be Defined for Specific Higher Layer Protocol) |

Fig. 4b — Table 106. Higher Layer Protocol Field Definition (e.g., Field 446 Above) — 450

| Value | Definition |
|---|---|
| 0x00 | Reserved/Defined |
| 0x01 | TR-181 Transport Protocol (for TR-181 HLD signaling) |
| 0x02-0xFF | Reserved (e.g., Vendor Specific HLD Signaling) |

Fig. 4c — P1905.1 Vendor Specific TLV — 470

| Vendor Specific TLV | 0x11 | 1 | Number of Octets Following |
|---|---|---|---|
| TLV Length | 2 | 17 | |
| TLV Value | n octets | n | Various | The Vendor Specific Information |

US 11,949,555 B2

SETTING COUNTRY CODE IN A NETWORK ACCESS DEVICE DURING AN ONBOARDING PROCESS

BACKGROUND

The subject matter of the present disclosure relates generally to setting of a country code in a network access device during onboarding of the network access device using a predetermined type of message.

Network access devices, such as Gateways and Extenders, are used to establish a network, such as a mesh network, tree network, hybrid network, etc., wherein Gateways and Extenders may both be referred to as Access Points (APs). Network access devices may connect to at least one root device either wirelessly or via a wired connection. A root device is a network access device that is directly coupled to a Wide Area Network (WAN), e.g., a cable network, A non-root device is a network access device that is not directly connected to the WAN. A non-root device accesses the WAN through the root device. A non-root device can communicate with the root device directly, or through another non-root device. There could be one or more root devices and multiple non-root devices in the wireless network.

Manufacturers of network access devices simplify the number of models to be deployed by providing a limited number of variants. The variants of models provided may be limited by restricting models to geographical areas (regions) of the world. One model may be provided for deployment in the Americas (e.g., North, Central, and South America), and a second model may be provide for deployment in Europe.

Since it is unknown until deployment time into which country the devices will be deployed, these devices are provisioned at the factory with either 1) a regional country code for Europe, or 2) a regional country code for the Americas, or other regions as determined by the manufacturing process. As part of the design features for the network access devices, e.g., extenders, the fronthaul basic service sets (fBSSs) may be configured to remain in the downstate until the correct country code is provided once it becomes part of the wireless local area network (WLAN) via an onboarding process. Thus, the country code should be provided to a newly onboarded network access device, such as an extender, in an expedient manner such that the customer of the product quickly sees the device acting as part of the WLAN including the powers and channel sets allowed in the country in which it is deployed.

SUMMARY

An aspect of the present disclosure involves setting of a country code in a network access device during onboarding of the network access device using a predetermined type of message.

A network access device, such as an extender or Multi-AP Device, includes one or more backhaul stations providing one of a wireless backhaul connection and a wired backhaul connection to communicate with a root device, one or more of Fronthaul Basic Service Set (fBSS) radios initially configured in a downstate, a memory storing computer-readable instructions and includes a factory default or non-operative country code, and a processor configured to execute the computer-readable instructions to initiate an onboarding process through the root device using the one or more backhaul stations, during the onboarding process, receive a country code in a predetermined type of message, store the country code received in the predetermined type of message in the memory, and configure the one or more fBSS radios using the country code received in the predetermined type of message.

The onboarding process includes a Dynamic Host Configuration Protocol (DHCP) operation, wherein the processor sends a DHCP request message that includes one of Option 60 for IPv4 and Option 16 for IPv6 specifying a vendor class identifier to request return of the country code, and wherein the predetermined type of message is a DHCP acknowledge message that includes one of Option 43 for IPv4 and Option 17 for IPv6 that provides the country code in returned vendor specific information.

The onboarding process includes EasyMesh discovery, wherein the predetermined message type comprises an HLD TLV message, and wherein a multi-AP agent of the extender interacts with a multi-AP controller in the root device via HLD TLV messaging to receive the country code.

The HLD TLV message includes a TR-181 field having one or more values that include the country code.

The HLD TLV message includes a vendor specific field having one or more values that include the country code.

The onboarding process includes a P1905.1 configuration process, wherein the predetermined message type comprises an a P1905.1 Vendor Specific TLV message, and wherein the processor receives the P1905.1 Vendor Specific TLV message.

The P1905.1 Vendor Specific TLV message includes one or more Vendor Specific Parameters including the country code.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings:

FIG. 4a illustrates a Higher Layer Data TLV message format table.

FIG. 4b illustrates a Higher Layer Protocol field definition table.

FIG. 4c illustrates a P1905.1 Vendor Specific TLV table.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to setting of a country code in a network access device during onboarding of the network access device using a predetermined type of message. A network access device obtains the country code using only resources in the WLAN, without the need of outside servers such as a TR-069 ACS or proprietary server solutions. While using a server for configuring the country code in a network access device is a valid option, it can result in a delayed country code configuration and can add considerable complexity to the server solution. Accordingly, by using a predetermined type of message to obtain the country code during the onboarding process, the country code may be set quickly and seamlessly.

Figure 1:
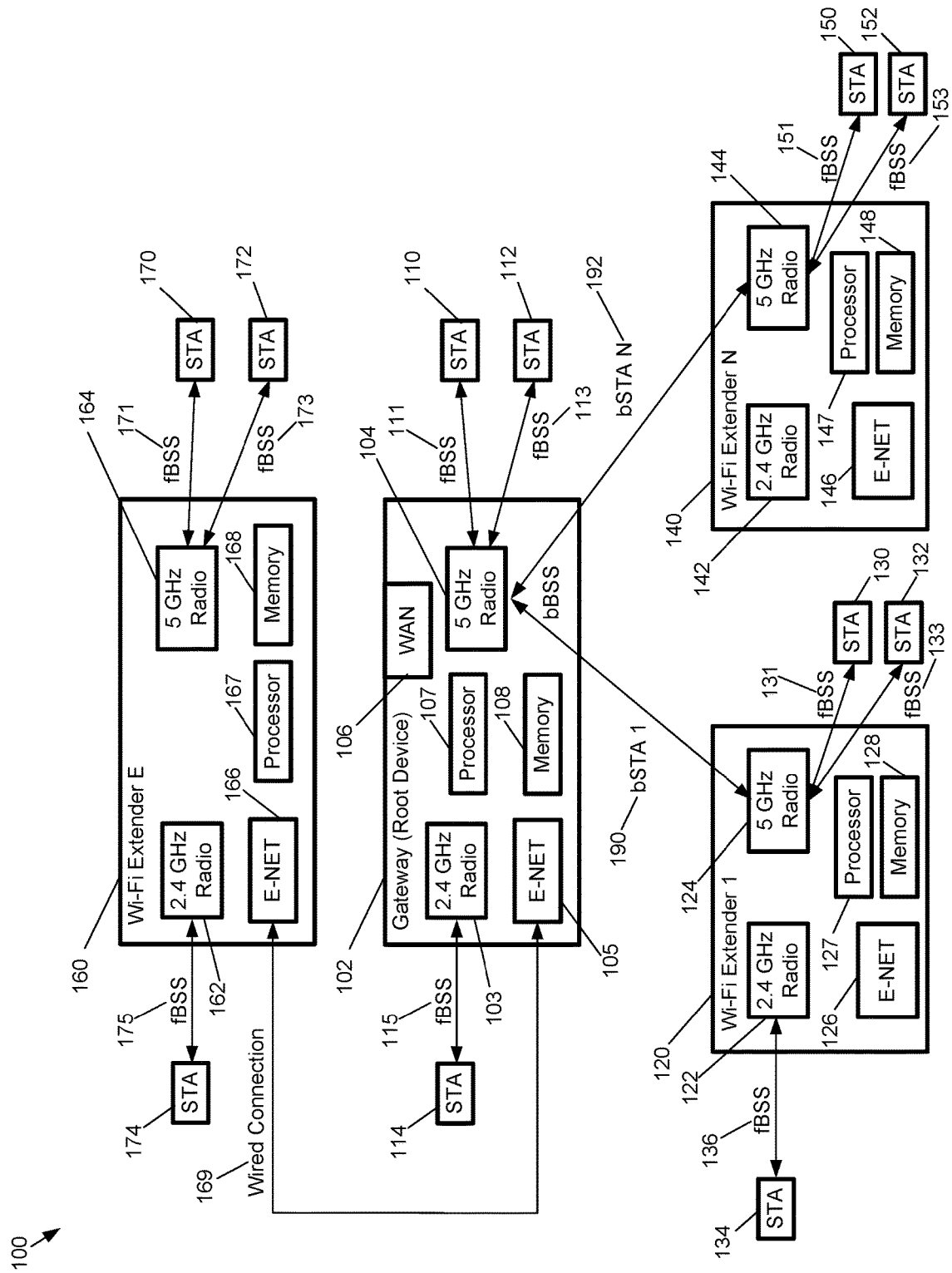
FIG. 1 illustrates a network diagram.

FIG. 1 illustrates a network diagram 100.

In FIG. 1, a Gateway 102 includes one or more transceivers, such as a 2.4 GHz Radio (e.g., transceiver) 103, a 5 GHz Radio (e.g., transceiver) 104, an Ethernet transceiver (media access unit) 105, and a Wide Area Network (WAN) transceiver 106. While not shown in FIG. 1, Gateway 102 may include different or additional transceivers such as a 6 GHz transceiver, 60 GHz transceivers, etc. Those skilled in the art will recognize that other types of wired or wireless transceivers, whether currently existing or that may be developed in the future, may be included without limitation. Processor 107 executes instructions in memory 108 to implement operation of Gateway 102 including control of operation of transceivers, e.g., 2.4 GHz Radio 103, 5 GHz Radio 104, Ethernet transceiver 105, WAN transceiver 106, etc., as well as configuration and control of fronthaul connections and backhaul connections. For example, Processor 107 configures Gateway 102 to provide a wireless fronthaul basic service set (fBSS) 111 between Station (STA) 110 and the 5 GHz Radio 104, a wireless fronthaul basic service set (fBSS) 113 between STA 112 and the 5 GHz Radio 104, and a wireless fronthaul basic service set (fBSS) 115 between STA 114 and the 2.4 GHz Radio 103.

FIG. 1 also shows Wi-Fi Extender 1 120 and Wi-Fi Extender N 140. Wi-Fi Extender 1 120 includes one or more transceivers, such as a 2.4 GHz Radio 122, a 5 GHz Radio 124, and Ethernet transceiver 126. While not shown in FIG. 1, Wi-Fi Extender 1 120 may include different or additional transceivers such as a 6 GHz transceiver, 60 GHz transceivers, etc. Those skilled in the art will recognize that other types of wired or wireless transceivers, whether currently existing or developed in the future, may be included without limitation. Processor 127 executes instructions in memory 128 to implement operation of Wi-Fi Extender 1 120 including control of operation of transceivers, e.g., 2.4 GHz Radio 122, 5 GHz Radio 124, Ethernet transceiver 126, etc., as well as configuration and control of fronthaul connections and backhaul connections.

Similarly, Wi-Fi Extender N 140 includes one or more transceivers, such as a 2.4 GHz Radio 142, a 5 GHz Radio 144, and Ethernet transceiver 146. Again, while not shown in FIG. 1, Wi-Fi Extender N 140 may also include different or additional transceivers such as a 6 GHz transceiver, 60 GHz transceivers, etc. Those skilled in the art will recognize that other types of wired or wireless transceivers, whether currently existing or developed in the future, may be included without limitation. Processor 147 executes instructions in memory 148 to implement operation of Wi-Fi Extender N 140 including control of operation of transceivers, e.g., 2.4 GHz Radio 142, 5 GHz Radio 144, and Ethernet transceiver 146, etc., as well as configuration and control of fronthaul connections and backhaul connections.

Each of Wi-Fi Extender 1 120 and Wi-Fi Extender N 140 may be provisioned with only a regional country code and need to obtain a correct operating country code via an onboarding process. Initially the Fronthaul Basic Service Set (fBSS) radios, e.g., 2.4 GHz Radio 122, and 5 GHz Radio 124, are configured in a downstate. As with Wi-Fi Extender 1 120, the Fronthaul Basic Service Set (fBSS) radios, e.g., 2.4 GHz Radio 122, and 5 GHz Radio 124, are also initially configured in a downstate. However, one or more of 2.4 GHz Radio 122 and 5 GHz Radio 124 of Wi-Fi Extender 1 120, and one or more of 2.4 GHz Radio 142 and 5 GHz Radio 144 of Wi-Fi Extender 1 140 may be configured to provide one or more wireless backhaul connections operating as a station device.

Accordingly, as shown in FIG. 1, 5 GHz Radio 124 of Wi-Fi Extender 1 120 connects to a BSS with 5 GHz Radio 104 of Gateway 102 to access backhaul connectivity (backhaul STA (bSTA) 190. Similarly, 5 GHz Radio 144 of Wi-Fi Extender N 140 may connect to a BSS with 5 GHz Radio 104 of Gateway 102 to access backhaul connectivity (backhaul STA (bSTA) 192.

Processors 127, 147 of Wi-Fi Extender 1 120 and Wi-Fi Extender N 140, respectively, are then able to initiate an onboarding process through Gateway 102 (the root device) using the one or more bSTAs 190, 192. During the onboarding process, Processors 127, 147 of Wi-Fi Extender 1 120 and Wi-Fi Extender N 140, respectively, receive a country code in a predetermined type of message, store the country code received in the predetermined type of message in memory 128, 148, and configure one or more fBSS radios, e.g., 2.4 GHz Radio 122 and 5 GHz Radio 124, and 2.4 GHz Radio 142, 5 GHz Radio 144, using the country code received in the predetermined type of message. Then, Processor 127 configures Wi-Fi Extender 1 120 to provide a wireless fronthaul basic service set (fBSS) 131 between STA 130 and the 5 GHz Radio 124, a wireless fronthaul basic service set (fBSS) 133 between STA 132 and the 5 GHz Radio 124, and a wireless fronthaul basic service set (fBSS) 136 between STA 134 and the 2.4 GHz Radio 122, all in accordance with appropriate power and channel regulations for the current country of deployment. In a similar manner, Processor 147 configures Wi-Fi Extender N 120 to provide a wireless fronthaul basic service set (fBSS) 151 between STA 150 and the 5 GHz Radio 144, and a wireless fronthaul basic service set (fBSS) 153 between STA 152 and the 5 GHz Radio 144.

In FIG. 1, Ethernet Wi-Fi Extender 160 is shown to include a 2.4 GHz Radio (e.g., transceiver) 162, a 5 GHz Radio (e.g., transceiver) 164, and Ethernet transceiver (media access unit) 166. Again, while not shown in FIG. 1, Wi-Fi Extender 160 may also include different or additional transceivers such as a 6 GHz transceiver, 60 GHz transceivers, etc. Those skilled in the art will recognize that other types of wired or wireless transceivers, whether currently existing or developed in the future, may be included without limitation. Processor 167 executes instructions in memory 168 to implement operation of Ethernet Wi-Fi Extender 160 including control of operation of 2.4 GHz Radio 162, 5 GHz Radio 164, Ethernet transceiver 166, etc., as well as configuration and control of fronthaul connections and backhaul connections. As described above with respect to Wi-Fi Extender 1 120 and Wi-Fi Extender N 140, Ethernet Wi-Fi Extender 160 may be provisioned with only a regional country code and needs to obtain a correct operating country code via an onboarding process. Initially the Fronthaul Basic Service Set (fBSS) radios, e.g., 2.4 GHz Radio 162, and 5 GHz Radio 164, are configured in a downstate. However, a wired connection 169, e.g., an Ethernet connection, is provided between Ethernet transceiver 106 of Gateway 102 and Ethernet transceiver 166 of Ethernet Wi-Fi Extender 160.

Processor 167 of Ethernet Wi-Fi Extender 160 is able to initiate an onboarding process through Gateway 102 (the root device) using the wired connection 169. During the onboarding process, Processor 167 of Ethernet Wi-Fi Extender 160 receives a country code in a predetermined type of message, stores the country code received in the predetermined type of message in memory 168, and configures one or more fBSS radios, e.g., 2.4 GHz Radio 162 and 5 GHz Radio 164, using the country code received in the predetermined type of message. Then, Processor 167 configures Ethernet Wi-Fi Extender 160 to provide a wireless fronthaul basic service set (fBSS) 171 between STA 170 and the 5 GHz Radio 164, a wireless fronthaul basic service set (fBSS) 173 between STA 172 and the 5 GHz Radio 164, and a wireless fronthaul basic service set (fBSS) 175 between STA 174 and the 2.4 GHz Radio 162, all in accordance with appropriate power and channel regulations for the current country of deployment.

Thus, Wi-Fi Extender 1 120, Wi-Fi Extender N 140, and Ethernet Wi-Fi Extender 160 have fBSS radios initially configured in a downstate and only a regional country code is provided to each, a country code is obtained through a predetermined type of message during the onboarding process so that the fBSS radios may be configured to provide fronthaul connectivity to client stations in accordance with appropriate power and channel regulations for the current country of deployment. Once the country code has been set in the extenders, any subsequent configurations of the same country code can be ignored.

Figure 2:
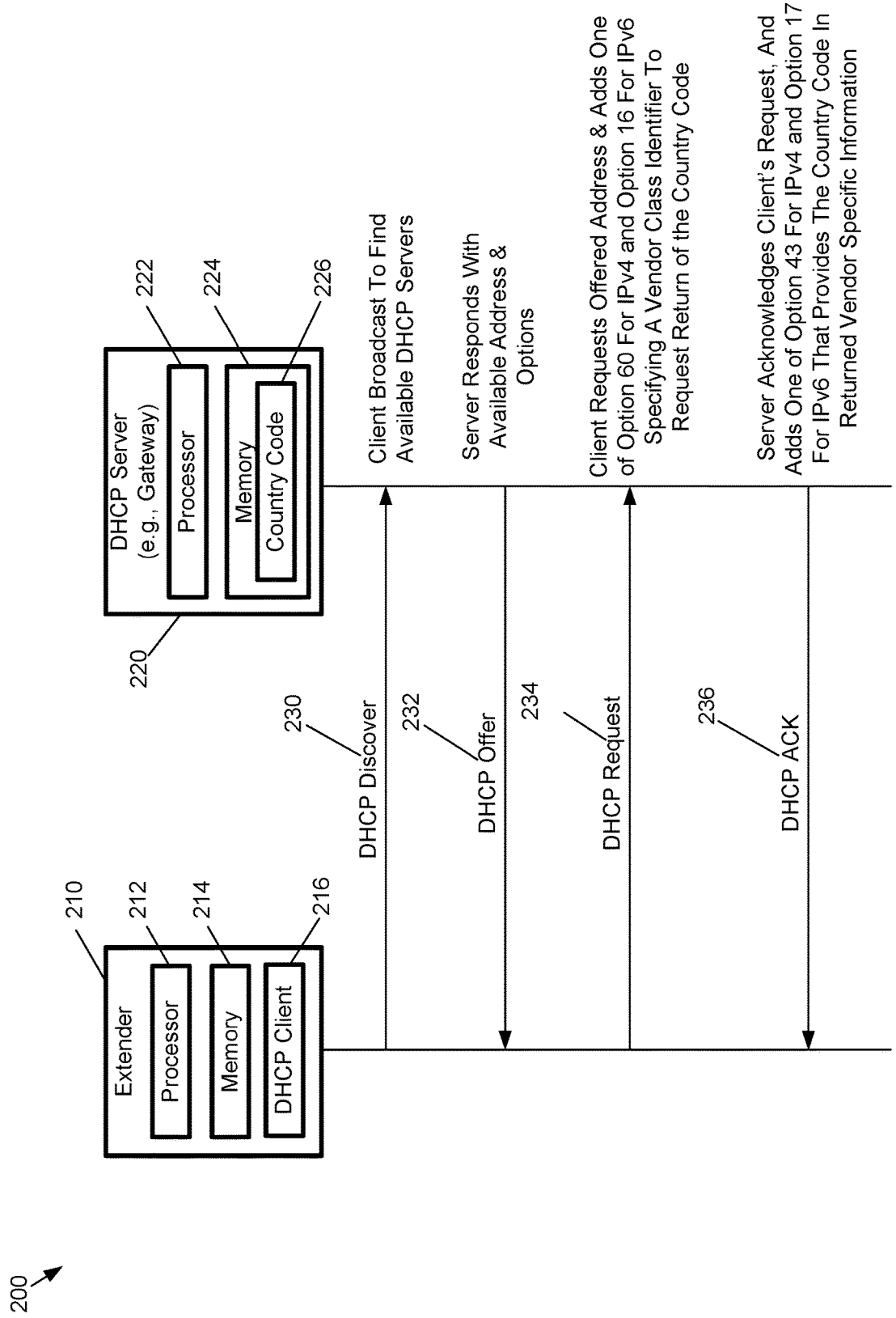
FIG. 2 illustrates a Dynamic Host Configuration Protocol (DHCP) onboarding process.

FIG. 2 illustrates a Dynamic Host Configuration Protocol (DHCP) onboarding process 200.

In FIG. 2, an Extender 210 is shown in communication with a DHCP Server 220, such as a gateway or other root device. Extender 210 includes Processor 212, Memory 214, and DHCP Client 216. Processor 212 executes instruction stored in Memory 214 to obtain a country code through the Dynamic Host Configuration Protocol (DHCP) onboarding process 200 as described in detail below. DHCP Server 220 includes Processor 222, and Memory 224. DHCP Server 220 maintains one or more Country Codes 226 in Memory 224.

Using DHCP Client 216, Extender 210 broadcasts a DHCP Discover message 230 to find available DHCP Servers. DHCP Server 220 receives the DHCP Discover message 230. DHCP Server 220 sends a DHCP Offer message 232 that provides an available address and options. The Extender 210 sends a DHCP Request message 234 to the DHCP Server 220. The DHCP Request message 234 provides a request by the Extender 210 to use the offered address and includes one of Option 60 for IPv4 (Internet Protocol version 4) and Option 16 for IPv6 (Internet Protocol version 6) that specifies a Vendor Class Identifier to request return of a country code from the DHCP Server 220. The DHCP Server 220 sends a DHCP Acknowledgement (ACK) message 236 to acknowledge the request by the Extender 210, wherein the DHCP Acknowledgement (ACK) message 236 includes one of Option 43 for IPv4 and Option 17 for IPv6 that provides the country code in returned Vendor Specific Information.

Once the Extender 210 receives the country code from the DHCP Server 220 during the onboarding processes, i.e., the DHCP operations, the Extender 210 is able to configure its fBSS radios to provide fronthaul connectivity to client stations in accordance with appropriate power and channel regulations for its current country of deployment. Thereafter, any subsequent country code configurations can be ignored.

Figure 3:
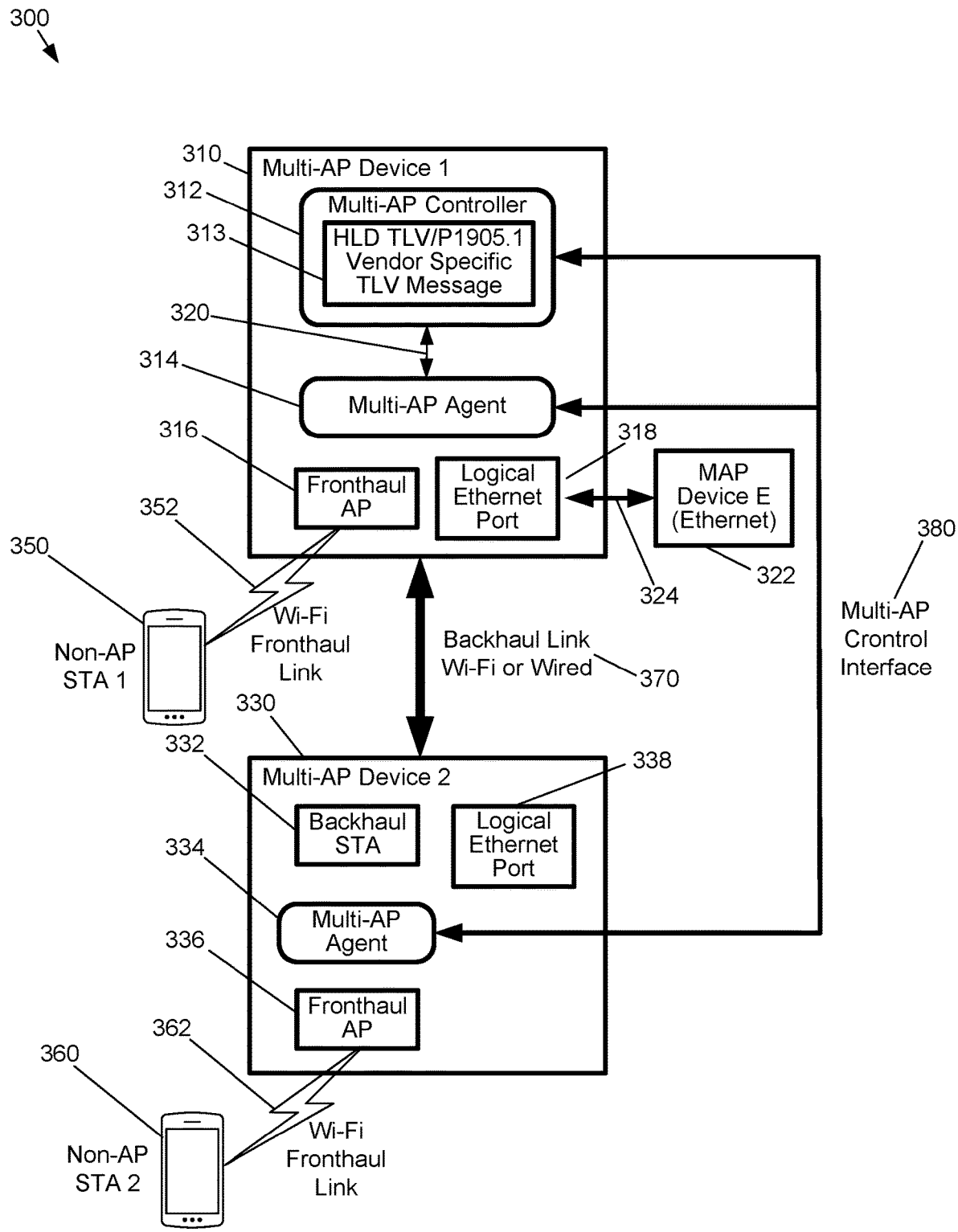
FIG. 3 illustrates an example of deployment of a multiple access point (Multi-AP or MAP) network.

FIG. 3 illustrates an example of deployment of a multiple access point (Multi-AP or MAP) network 300.

In FIG. 3, the Multi-AP network 300 is shown to include Multi-AP Device 1 310. Multi-AP Device 1 310 may be a gateway that acts as a root device for other devices in the Multi-AP network 300. Multi-AP Device 1 310 includes a Multi-AP Controller 312, a Multi-AP Agent 314, a Fronthaul AP 316, and a Logical Ethernet Port 318. Multi-AP Controller 312 and Multi-AP Agent 314 communicate through connection 320. Logical Ethernet Port 318 provides a Logical Ethernet Link 324 to an Ethernet Multi-AP Device 322. Multi-AP Controller 312 controls the fronthaul APs 316 and backhaul links 370 in the Multi-AP network 300. Multi-AP Controller 312 establishes a Wi-Fi Fronthaul Link 352 with Non-AP STA 1 using Fronthaul AP 316.

FIG. 3 also shows Multi-AP Device 2 330. Multi-AP Device 2 330 may be an Extender in the Multi-AP network 300. Multi-AP Device 2 330 includes a Backhaul STA 332, a Multi-AP Agent 334, a Fronthaul AP 336, and a Logical Ethernet Port 338. Multi-AP Control Interface 370 links Multi-AP Device 1 310 and Multi-AP Device 2 330 to provide configuration and control functions for fronthaul APs 316, 336 and backhaul links 370. Multi-AP Control Interface 370 exists between the Multi-AP Controller 32 and Multi-AP Agents 314, 334.

Multi-AP Device 1 310 and Multi-AP Device 2 330 with respective Multi-AP Agents 314, 334 connect to each other over a backhaul link 370, which may be either a Wi-Fi link or a wired Logical Ethernet Link. Multi-AP Controller 312 also provides onboarding functionality to onboard and provision Multi-AP devices, e.g., Multi-AP Device 2 330, onto the Multi-AP network 330. Multi-AP Agent 314 executes commands received from Multi-AP Controller 312, and reports measurements and capabilities data for fronthaul APs 316, clients (e.g., Multi-AP Device 2 330) and backhaul links 370 to a Multi-AP Controller 312 and/or to other Multi-AP Agents, e.g., Multi-AP Agent 334.

Before joining the Multi-AP network 300, Multi-AP Device 2 330 will have its fBSS radios, i.e., Fronthaul AP 336, initially configured in a downstate. Also, Multi-AP Device 2 330 initially only has a regional country code. Thus, Multi-AP Device 2 330 must obtain a country code through a predetermined type of message using the backhaul link 370 during the onboarding process with Multi-AP Device 1 310 so that the fBSS radios may be configured to provide fronthaul connectivity to client stations in accordance with appropriate power and channel regulations for the current country of deployment once the country code has been received.

Multi-AP Device 2 330 may initiate onboarding with Multi-AP Device 1 310 by performing EasyMesh discovery. Multi-AP Controller 312 of Multi-AP Device 1 310 sends an HLD TLV message 313 to Multi-AP Device 2 330. The Higher Layer Data (HLD) Type Length Value (TLV) message 313 may include a TR-181 field that includes the country code. Alternatively, the HLD TLV message 313 may a vendor specific field that includes the country code.

Thus, Multi-AP Controller 312 of Multi-AP Device 1 310 sends a packet carrying an HLD TLV that utilizes a TR-181 message or vendor specific signaling to setParameterValues including the country code. Multi-AP Agent 334 of Multi-AP Device 2 330 passes the setParameterValues or vendor specific command to an upper layer which will then invoke a Remote Procedure Call (RPC) to issue the setParameterValues or vendor specific command to the WLAN radio drivers in Fronthaul AP 336.

The setParameterValues or vendor specific command may be sent on a per radio basis, but the Multi-AP Controller 312 of Multi-AP Device 1 310 should already have the configuration (number of radios, and radio types) from the Multi-AP Device 2 330 per the EasyMesh discovery process. Once the Multi-AP Device 2 330 has received the country code, the Multi-AP Device 2 330 will then configure this country code into its local radio(s), e.g., Fronthaul AP 336, and non-volatile memory. Subsequent HLD receptions can be ignored if the received country code matches the country code programmed into the Multi-AP Device 2 330.

Multi-AP Device 2 330 may also initiate onboarding with Multi-AP Device 1 310 through a by performing P1905.1 configuration process. The Multi-AP Controller 312 of Multi-AP Device 1 310 may send a message containing a P1905.1 Vendor Specific TLV message that includes the country code.

Once Multi-AP Device 2 330 receives the country code through the EasyMesh Discovery process or through the P1905.1 configuration process, Multi-AP Device 2 330 may configure the fBSS radios to provide fronthaul connectivity to Non-AP STA 2 using Wi-Fi Fronthaul Link 362 in accordance with appropriate power and channel regulations for the current country of deployment. Once the country code has been set, any subsequent country code configurations can be ignored.

FIG. 4a illustrates a Higher Layer Data TLV message format table 410.

FIG. 4a shows values for fields 412, a field length 420, field values 430, and description 440. The tivType 414 is for the Higher Layer Data TLV 442 and is 1 octet 422 in length and has a value of 0xA0. The tivLength 416 is associated with the Number of Octets in the Ensuing Field 444, and is 2 octets 424 in length and has a value that is variable 434. The tivValue 418 includes the Higher Layer Protocol 446 and the Higher Layer Protocol Payload 448, which is defined for specific higher layer protocol. The Higher Layer Protocol 446 has a length of 1 octet and a value that is variable 436. The value of the Higher Layer Protocol 446 is defined in Table 106 of FIG. 4b. The Higher Layer Protocol Payload 448 has a length that is variable 428 and a value that is variable 438.

FIG. 4b illustrates a Higher Layer Protocol field definition table 450.

In FIG. 4b, the Higher Layer Protocol field definition table 450 shows the values 452 and definition 460 for the Higher Layer Protocol 446 of Table 51 in FIG. 4a. FIG. 4b shows the value of 0x00 is reserved/later defined 462. The TR-181 Transport Protocol 464 provides TR-181 Higher Layer Data signaling to provide the country code. Technical Report (TR)-181 464 defines a device data mode for access devices such as modems, routers, gateways, as well as end-user devices which connect to the Internet, such as set-top boxes, and VoIP-phones. The value for the TR-181 Transport Protocol 464 is 0x01 456. Field 468 is reserved and may be used to provide vendor specific Higher Layer Data signal to provide the country code. The value for field 468 may have a range of 0x02-0xFF 458.

FIG. 4c illustrates a P1905.1 Vendor Specific TLV table 470.

The table in FIG. 4c identifies a Vendor Specific TLV 472, a TLV Length 474 which is the size of the value field or the number of octets following 494, e.g., "2" 484, "n" 490, and a TLV Value 476 which is a variable-sized data field, e.g., n octets 486, various 493, which contains data for the Vendor Specific Information 496. The TLV Value 476 for the Vendor Specific Information 496 provides the country code to the network access device.

Figure 5:
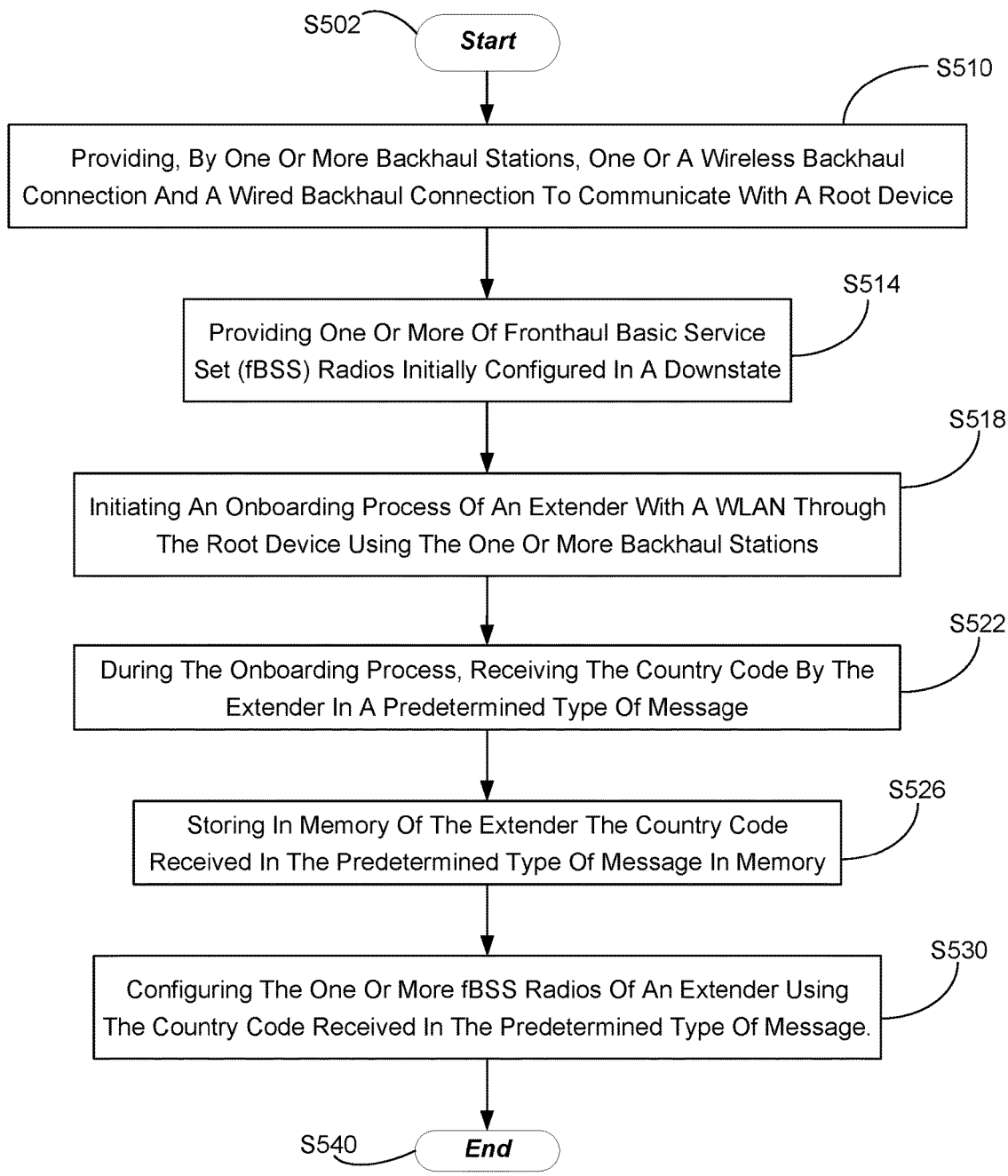
FIG. 5 is a flow chart of a method for setting a country code in a network access device during an onboarding process of the network access device using a predetermined type of message.

FIG. 5 is a flow chart of a method 500 for setting a country code in a network access device during an onboarding process of the network access device using a predetermined type of message.

In FIG. 5, method 500 starts (S502), and one of a wireless backhaul connection and a wired backhaul connection are provided by one or more backhaul stations for communicating with a root device (S510). As described in FIG. 1, 5 GHz Radio 124 of Wi-Fi Extender 1 120 connects to a BSS with 5 GHz Radio 104 of Gateway 102 to access backhaul connectivity (backhaul STA (bSTA) 190. Similarly, 5 GHz Radio 144 of Wi-Fi Extender N 140 may connect to a BSS with 5 GHz Radio 104 of Gateway 102 to access backhaul connectivity (backhaul STA (bSTA) 192.

One or more of Fronthaul Basic Service Set (fBSS) radios are initially configured in a downstate (S514). With regard to FIG. 1, each of Wi-Fi Extender 1 120 and Wi-Fi Extender N 140 may be provisioned with only a regional country code and need to obtain a correct operating country code via an onboarding process. Initially the Fronthaul Basic Service Set (fBSS) radios, e.g., 2.4 GHz Radio 122, and 5 GHz Radio 124, etc., are configured in a downstate. As with Wi-Fi Extender 1 120, the Fronthaul Basic Service Set (fBSS) radios, e.g., 2.4 GHz Radio 122, and 5 GHz Radio 124, etc., are also initially configured in a downstate.

An onboarding process of an extender is initiated through the root device using the one or more backhaul stations (S518). As described with respect to FIG. 1, Processors 127, 147 of Wi-Fi Extender 1 120 and Wi-Fi Extender N 140, respectively, are then able to initiate an onboarding process through Gateway 102 (the root device) using the one or more bSTAs 190, 192.

During the onboarding process, the country code is received by the extender in a predetermined type of message (S522). As described with respect to FIG. 1, during the onboarding process, Processors 127, 147 of Wi-Fi Extender 1 120 and Wi-Fi Extender N 140, respectively, receive a country code in a predetermined type of message.

The country code received in the predetermined type of message is stored in memory of the extender (S526). As described with respect to FIG. 1, Processors 127, 147 of Wi-Fi Extender 1 120 and Wi-Fi Extender N 140, respectively, store the country code received in the predetermined type of message in memory 128, 148.

The one or more fBSS radios of an extender are configured using the country code received in the predetermined type of message (S530). As described with respect to FIG. 1, Processors 127, 147 of Wi-Fi Extender 1 120 and Wi-Fi Extender N 140, respectively, configure one or more fBSS radios, e.g., 2.4 GHz Radio 122 and 5 GHz Radio 124, etc., and 2.4 GHz Radio 142, 5 GHz Radio 144, etc., using the country code received in the predetermined type of message. Then, Processor 127 configures Wi-Fi Extender 1 120 to provide, for example, a wireless fronthaul basic service set (fBSS) 131 between STA 130 and the 5 GHz Radio 124, a wireless fronthaul basic service set (fBSS) 133 between STA 132 and the 5 GHz Radio 124, and a wireless fronthaul basic service set (fBSS) 136 between STA 134 and the 2.4 GHz Radio 122. In a similar manner, Processor 147 configures Wi-Fi Extender N 120 to provide, for example, a wireless fronthaul basic service set (fBSS) 151 between STA 150 and the 5 GHz Radio 144, and a wireless fronthaul basic service set (fBSS) 153 between STA 152 and the 5 GHz Radio 144.

As described with respect to FIG. 1, the country code may be used by Processors 127, 147, 167 to configure any of their fBSS radios. While not shown in FIG. 1, Wi-Fi Extender 120, Wi-Fi Extender 140, Ethernet Wi-Fi Extender 160 may include different or additional fBSS transceivers, such as a 6 GHz transceiver, 60 GHz transceivers, etc. Those skilled in the art will recognize that other types of wired or wireless transceivers, whether currently existing or that may be developed in the future, may be included without limitation.

The method then ends (S540).

Figure 6:
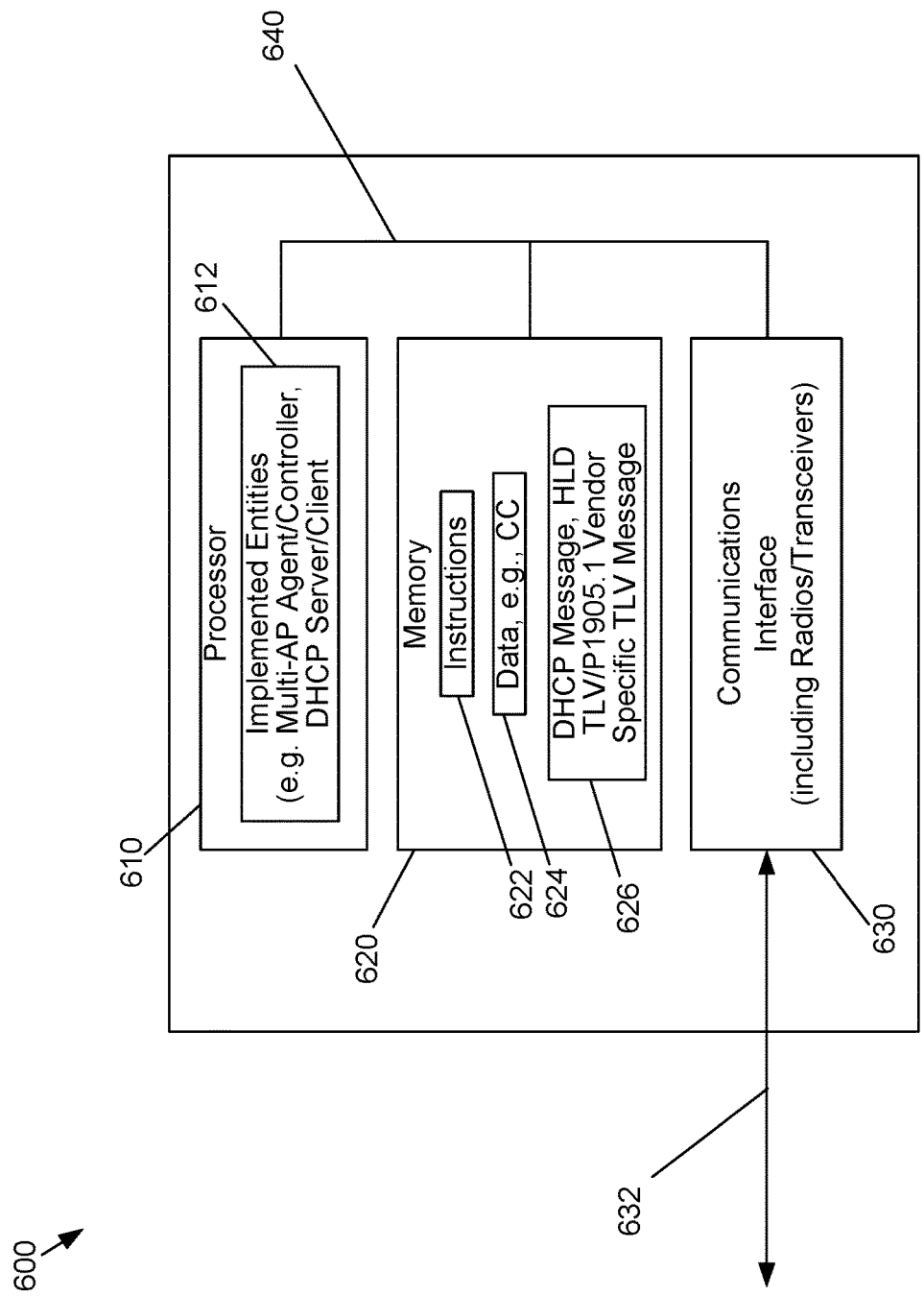
FIG. 6 illustrates a block diagram of a Network Access Device.

FIG. 6 illustrates a block diagram of a Network Access Device 600.

In FIG. 6, Network Access Device 600 may be an Extender or a Multi-AP Device. The Network Access Device 600 includes a Processor 610, Memory 620, and Communication Interface 630, including Radios/Transceivers. Processor 610, Memory 620, and Communications Interface 630 communicate via link 640. Communications Interface 630 receives and transmits data via connection 632. Connection 632 may be a wireless or wired connection and may be a fronthaul connection or a backhaul connection.

Processor 610 executes Instructions 622 in Memory 620 to implement operation of Network Access Device 600 including control of operation of Communication Interface 630 to provide fronthaul connections and backhaul connections via Connection 632. Processor 610 also executes Instructions 622 in Memory 620 to implement entities 612, such as Multi-AP Controllers, Multi-AP Agents, DHCP Server, and/or DHCP Client. Memory 620 may store a Country Code 624, which may have been obtained via a predetermined type of message 626 during an onboarding process. The predetermined type of message 626 depends on the onboarding process and may be a DHCP Message, an HLD TLV message (via a TR-181 transport protocol field or vendor specific HLD signaling), or a P1905.1 Vendor Specific TLV message.

Figure 7:
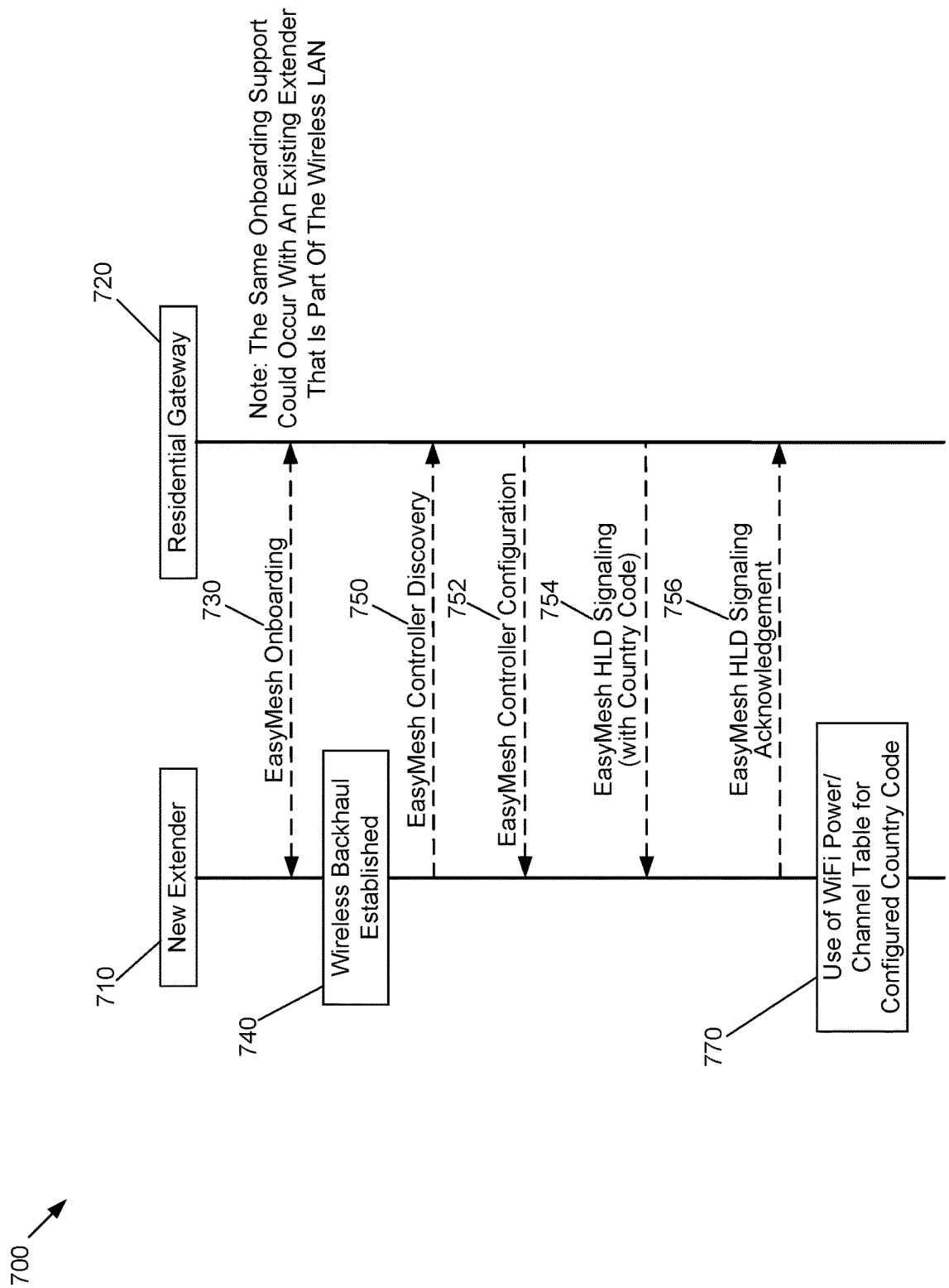
FIG. 7 illustrates signaling for an onboarding process.

FIG. 7 illustrates signaling 700 for an onboarding process.

New Extender 710 may initiate EasyMesh Onboarding 730 with Residential Gateway 720. The same onboarding process 730 could occur with an existing Extender that is part of the wireless LAN with the Residential Gateway 720. The wireless backhaul is established 740. The New Extender 710 may then perform EasyMesh Controller Discovery 750. The Residential Gateway 720 provides the New Extender 710 with EasyMesh Controller Configuration 752. The Residential Gateway 720 provides the New Extender 710 with EasyMesh HLD Signaling 754 to provide the New Extender 710 the country code. The New Extender provides the Residential Gateway 720 with EasyMesh HLD Signaling Acknowledge to confirm receipt of the country code. The New Extender 710 then uses the Wi-Fi power/channel table for the configured country code 770 to connect with client stations.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. An extender, comprising:
one or more backhaul stations providing one of a wireless backhaul connection and a wired backhaul connection to communicate with a root device,
one or more of Fronthaul Basic Service Set (fBSS) radios initially configured in a downstate;
a memory storing computer-readable instructions and includes a factory default or non-operative country code; and
a processor configured to execute the computer-readable instructions to:
initiate an onboarding process through the root device using the one or more backhaul stations;
during the onboarding process, receive a country code in a predetermined type of message;
store the country code received in the predetermined type of message in the memory; and
configure the one or more fBSS radios using the country code received in the predetermined type of message.

2. The extender of claim 1, wherein the onboarding process comprises a Dynamic Host Configuration Protocol (DHCP) operation, wherein processor sends a DHCP request message that includes one of Option 60 for IPv4 and Option 16 for IPv6 specifying a vendor class identifier to request return of the country code, and wherein the predetermined type of message is a DHCP acknowledge message that includes one of Option 43 for IPv4 and Option 17 for IPv6 that provides the country code in returned vendor specific information.

3. The extender of claim 1, wherein the onboarding process comprises EasyMesh discovery, wherein the predetermined message type comprises an HLD TLV message, and wherein the processor implements a multi-AP agent that interacts with a multi-AP controller in the root device via HLD TLV messaging to receive the country code.

4. The extender of claim 3, wherein the HLD TLV message includes a TR-181 field having one or more values that include the country code.

5. The extender of claim 3, wherein the HLD TLV message includes a vendor specific field having one or more values that include the country code.

6. The extender of claim 1, wherein the onboarding process comprises a P1905.1 configuration process, wherein the predetermined message type comprises an a P1905.1 Vendor Specific TLV message, and wherein the processor receives the P1905.1 Vendor Specific TLV message.

7. The extender of claim 6, wherein the P1905.1 Vendor Specific TLV message includes one or more Vendor Specific Parameters including the country code.

8. A method for pushing a country code to an extender, comprising:
providing, by one or more backhaul stations, one of a wireless backhaul connection and a wired backhaul connection to communicate with a root device,
providing one or more of Fronthaul Basic Service Set (fBSS) radios initially configured in a downstate;
initiating an onboarding process of the extender through the root device using the one or more backhaul stations;
during the onboarding process, receiving the country code by the extender in a predetermined type of message;
storing in memory of the extender the country code received in the predetermined type of message; and
configuring the one or more fBSS radios using the country code received in the predetermined type of message.

9. The method of claim 8, wherein the initiating the onboarding process of the extender further comprises initiating a Dynamic Host Configuration Protocol (DHCP) operation by sending a DHCP request message that includes one of Option 60 for IPv4 and Option 16 for IPv6 specifying a vendor class identifier to request return of the country code, and wherein the receiving the country code in the predetermined type of message further comprises receiving a DHCP acknowledge message that includes one of Option 43 for IPv4 and Option 17 for IPv6 that provides the country code in returned Vendor Specific Information.

10. The method of claim 8, wherein the initiating the onboarding process of the extender further comprises initiating EasyMesh discovery, and wherein the receiving the country code by the extender in a predetermined type of message further comprises receiving the country code in an HLD TLV message at a multi-AP agent of the extender from a multi-AP controller in the root device.

11. The method of claim 10, wherein the receiving the country code in an HLD TLV message further comprises receiving the country code in a TR-181 field of the HLD TLV message, wherein the TR-181 filed includes one or more values that provide the country code.

12. The method of claim 10, wherein the receiving the country code in an HLD TLV message further comprises receiving the country code a vendor specific field of the HLD TLV message, wherein the vendor specific filed includes one or more values that provide the country code.

13. The method of claim 8, wherein the initiating the onboarding process of the extender further comprises initiating a P1905.1 configuration process, wherein the predetermined type of message further comprises a P1905.1 Vendor Specific TLV message, and wherein the P1905.1 Vendor Specific TLV message provides the country code.

14. The method of claim 13, wherein the P1905.1 Vendor Specific TLV message includes one or more Vendor Specific Parameters including the country code.

15. A non-transitory computer-readable media having computer-readable instructions stored thereon, which when executed by a processor causes the processor to perform operations comprising:
providing, by one or more backhaul stations, one of a wireless backhaul connection and a wired backhaul connection to communicate with a root device,
providing one or more of Fronthaul Basic Service Set (fBSS) radios initially configured in a downstate;
initiating an onboarding process of the extender through the root device using the one or more backhaul stations;
during the onboarding process, receiving the country code by the extender in a predetermined type of message;
storing in memory of the extender the country code received in the predetermined type of message; and
configuring the one or more fBSS radios using the country code received in the predetermined type of message.

16. The non-transitory computer-readable media of claim 15, wherein the initiating the onboarding process of the extender further comprises initiating a Dynamic Host Configuration Protocol (DHCP) operation by sending a DHCP request message that includes one of Option 60 for IPv4 and Option 16 for IPv6 specifying a vendor class identifier to request return of the country code, and wherein the receiving the country code in the predetermined type of message further comprises receiving a DHCP acknowledge message that includes one of Option 43 for IPv4 and Option 17 for IPv6 that provides the country code in returned Vendor Specific Information.

17. The non-transitory computer-readable media of claim 15, wherein the initiating the onboarding process of the extender further comprises initiating EasyMesh discovery, and wherein the receiving the country code by the extender in a predetermined type of message further comprises receiving the country code in an HLD TLV message at a multi-AP agent of the extender from a multi-AP controller in the root device.

18. The non-transitory computer-readable media of claim 17, wherein the receiving the country code in an HLD TLV message further comprises receiving the country code in a TR-181 field of the HLD TLV message, wherein the TR-181 filed includes one or more values that provide the country code.

19. The non-transitory computer-readable media of claim 17, wherein the receiving the country code in an HLD TLV message further comprises receiving the country code in a vendor specific field of the HLD TLV message, wherein the vendor specific filed includes one or more values that provide the country code.

20. The non-transitory computer-readable media of claim 15, wherein the initiating the onboarding process of the extender further comprises initiating a P1905.1 configuration process, wherein the predetermined type of message further comprises a P1905.1 Vendor Specific TLV message, and wherein the P1905.1 Vendor Specific TLV message provides the country code.

* * * * *